United States Patent [19]

Miyata et al.

[11] Patent Number: 4,633,214
[45] Date of Patent: Dec. 30, 1986

[54] DEVICE FOR DETECTING CENTER OF STEERING ANGLE IN VEHICLE

[75] Inventors: Hiroshi Miyata; Kazumasa Nakamura, both of Aichi, Japan

[73] Assignee: Toyota Jidosha Kabushiki Kaisha, Toyota, Japan

[21] Appl. No.: 576,480

[22] Filed: Feb. 2, 1984

[30] Foreign Application Priority Data

Feb. 7, 1983 [JP] Japan .................... 58-18628

[51] Int. Cl.$^4$ ............. B60Q 1/40; B60Q 1/42
[52] U.S. Cl. ........................ 340/73; 340/56
[58] Field of Search ........... 340/55, 56, 73, 52 R; 116/31; 364/424

[56] References Cited

U.S. PATENT DOCUMENTS 3,955,175  5/1976  Holt ............................. 340/73
4,058,797 11/1977  Sekiguchi et al. ........... 340/73 X
4,365,233 12/1982  Halmshaw .................... 340/73
4,384,270  5/1983  Morita et al. ................ 340/73
4,403,211  9/1983  Shibata et al. ............... 340/55

FOREIGN PATENT DOCUMENTS 41270  3/1982  Japan .

OTHER PUBLICATIONS

Timbie et al, Principles of Electrical Engineering, Apr. 1957, p. 216.

Primary Examiner—William M. Shoop, Jr.
Assistant Examiner—Sharon D. Logan
Attorney, Agent, or Firm—Cushman, Darby & Cushman

[57] ABSTRACT

The present invention relates to a device for detecting the center of a steering angle in a vehicle.

This device comprises a steering angle sensor provided on a vehicle steering mechanism for electrically detecting a steering angle, a temporary storing portion for temporarily storing a center value calculated in response to an output from the sensor through a first switch, a comparison circuit for comparing the center value stored in the temporary storage portion with an output from the steering angle sensor to ON-OFF operate the first switch, a center storage portion for taking out the center value in the temporary storage portion through a second switch to store the same, and a distance measuring portion controlled by the comparison circuit, for ON-OFF operating the second switch after a lapse of a predetermined running distance upon ON-operation of the first switch, the aforesaid center storage portion including an integration circuit having a resistor and a capacitor.

The device can reliably, electrically take out only the substantially effective change in the steering angle in a vehicle, so that various vehicle controls can be effectively performed.

3 Claims, 1 Drawing Figure

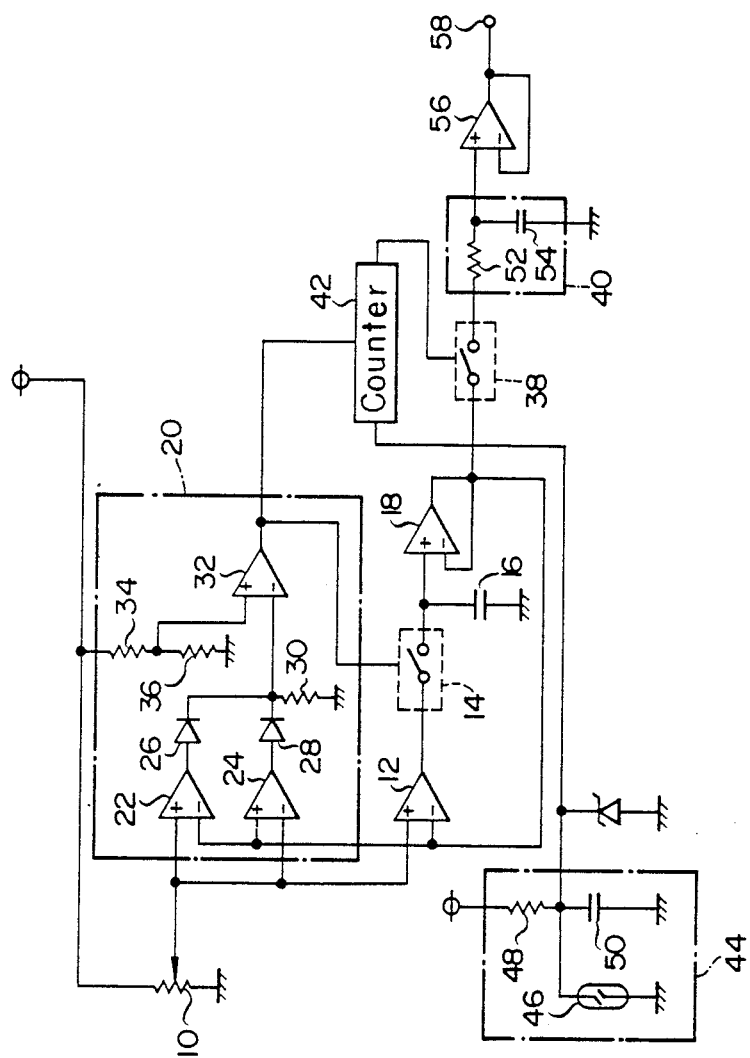

DEVICE FOR DETECTING CENTER OF STEERING ANGLE IN VEHICLE

BACKGROUND OF THE INVENTION

1. Field of the Invention

This invention relates to a device for detecting the center of a steering angle in a vehicle, and more particularly to an improved device for detecting the center of a steering angle, capable of eliminating a center error caused by the unsteadiness in steering in a short cycle, etc., and capable of accurately detecting an averaged center during running of the vehicle.

2. Description of the Prior Art

The center of a steering angle in a vehicle is very useful as the basic information for controlling the various components of the vehicle during running, and is widely used for the return control of a turn signal switch and so forth.

However, as has been well known, the steering of the vehicle has unsteadinesses in a short cycle. If a center is detected by constantly following such unsteadinesses, then there is presented a disadvantage that a component of error becomes excessively large, whereby the effective utilization of the detection signal is hampered in practice. Hence, heretofore, there have been proposed a number of methods of eliminating errors in detection due to the aforesaid unsteadinesses.

The invention disclosed in Japanese Patent Kokai (Laid-Open) No. 41270/82 has been well known as the preferable device for detecting the center of a steering angle of the prior art. According to this device, a center value detected from a steering angle sensor is temporarily stored in a temporary storage portion, the center value thus temporarily stored is successively renewed, only a renewed center value that continued for a predetermined distance during running of the vehicle is stored in a center storage portion, and the unsteadinesses in the steering in a short cycle other than the above are avoided being written into the center storage portion from the temporary storage portion to thereby be rejected, so that only the substantially effective center value can be taken out.

However, even the conventional device of the type described is disadvantageous in that an accurate center value for covering all of the various complicated running conditions of the vehicle cannot be obtained and that the aforesaid adoption or rejection of the center value only in dependence on the predetermined distance of running is unsatisfactory.

SUMMARY OF THE INVENTION

The present invention has been developed to obviate the above-described disadvantages of the prior art and has as its object the provision of an improved device for detecting the center of a steering angle in a vehicle, capable of reliably detecting an averaged center value based on the actual running condition.

To this end, the present invention contemplates that the aforesaid device comprises a steering angle sensor provided on a vehicle steering mechanism for electrically detecting a steering angle, a temporary storage portion for temporarily storing a center value calculated in response to an output from the sensor through a first switch, a comparison circuit for comparing the center value stored in the temporary storage portion with an output from the steering angle sensor to ON-OFF operate the first switch, a center storage portion for taking out the center value in the temporary storage portion through a second switch to store the same, and a distance measuring portion controlled by the comparison circuit, for ON-OFF operating the second switch after a lapse of a predetermined running distance upon ON-operation of the first switch, the aforesaid center storage portion including an integration circuit having a resistor and a capacitor.

BRIEF DESCRIPTION OF THE DRAWINGS

The drawing is a circuit diagram showing a preferred embodiment of the device for detecting the center of a steering angle in a vehicle according to the present invention.

DETAILED DESCRIPTION OF THE PREFERRED EMBODIMENT

Description will hereunder be given of one preferred embodiment of the present invention with reference to the drawings.

A vehicle steering angle sensor 10 provided on a vehicle steering mechanism comprises a potentiometer for electrically detecting a steering angle, etc. for example and can take out an electrical signal commensurate to the steering angle through an operation associated with a steering shaft.

An output from the sensor 10 is fed to a differential amplifier 12 where comparison of a center value is effected, and this center value is fed through a first switch 14 to a temporary storage portion 16 where the center value is temporarily stored. In the embodiment, the temporary storage portion 16 comprises a capacitor. In consequence, the temporary storage portion 16 renews its center value only in the condition of ON-operation of the first switch 14. The center value of the temporary storage portion 16 is fed to a terminal of the differential amplifier 12 through a differential amplifier 18, whereby the current center value is compared with an output from the sensor 10 and the renewal operation of the center value is effected.

A comparison circuit 20 is provided for ON-OFF operating the first switch 14. When a change exceeding a predetermined value takes place in the detection value of the sensor 10, the comparison circuit 20 outputs a comparison signal to ON-OFF operate the first switch 14. To do this, the comparison circuit 20 includes a differential amplifier 22 for detecting a right direction steering angle and a differential amplifier 24 for detecting a left direction steering angle.

An output from the sensor 10 and a current center value obtained through the differential amplifier 18 from the temporary storage portion 16 are fed to the respective plus and minus input terminals of the both differential amplifiers 22 and 24 by reversed polarity, respectively. In consequence, the both differential amplifiers 22 and 24 compare and calculate deviation values in steering angles to the right and the left from the current center value and output the results electrically. The outputs from the both differential amplifiers 22 and 24 are fed to a plus terminal of a differential amplifier 32 through diodes 26 and 28 as a voltage at opposite ends of a resistor 30. A reference value is fed from resistors 34 and 36 to one of terminals of the differential amplifier 32. When a deviation value in steering angle beyond a non-sensitive zone set by the reference value takes place, a comparison signal is emitted from the differential amplifier 32. More specifically, when the steering angle is deviated to the right or the left a predetermined value from the current center value, the comparison circuit 20 emits a signal.

In consequence, when the deviation value in steering angle takes place, the first switch 14 is ON-operated, whereby the center value in the temporary storage portion 16 is renewed.

The center value in the temporary storage portion 16 is fed to the center storage portion 40 through the second switch 38, and, when the center value in the temporary storage portion 16 is subjected to a substantial renewal in the center value other than the unsteadiness in steering in a short cycle and the like, the renewed center value is taken into the center storage portion 40.

To ON-operate the second switch 38 at a desired time for the selective take-in of the renewed center value, a distance measuring portion 42 is provided, which comprises a counter in the embodiment. As count inputs to the distance measuring portion 42, vehicle speed pulses are fed from a vehicle speed sensor 44. The count of a predetermined number of the vehicle speed pulses makes it possible to measure a predetermined distance. The vehicle speed sensor 44 includes a lead switch 46 interlocking with a wheel shaft, a resistor 48 and capacitor 50. An output is fed to the distance measuring portion 42 from the comparison circuit 20, whereby, when the comparison signal is emitted to ON-operate the first switch 14, the counter of the distance measuring portion 42 is reset to maintain a count action stopped state, whereas, when the first switch 14 is OFF-operated, the counter is set to count a predetermined number of pulses from the vehicle speed sensor 44. Then, after the predetermined number of pulses are counted, an ON-operation signal is fed to the second switch 38 temporarily.

According to the present invention, the center storage portion 40 comprises an integration circuit including a resistor 52 and a capacitor 54, so that an ON-operation time of the second switch 40 determined by the distance measuring portion 42 and an averaged signal from the temporary storage portion 16 can be taken in. Then, an output from the center storage portion 40 is fed through an output terminal 58 of a differential amplifier 56 to some other control device such as a turn-signal return device.

Description will now be given of action of the embodiment of the present invention with the above-described arrangement.

In the conditions of the start of running, stored value in the temporary storage portion 16 and the center storage portion 40 are at zero, and, if the steering angle then is fed to the comparison circuit 20, then the first switch 14 is ON-operated as commensurate to a deviation value from the center value exceeding the aforesaid non-sensitive zone.

In consequence, when the steering angle exceeds a predetermined value from the reference center value preset in the sensor 10, the center value in the temporary storage portion 16 is renewed by this value and stored and this process is successively repeated. Thereafter, the renewed center value and a center output due to the current steering angle are compared and this process is repeated, and the center value in the temporary storage portion 16 is renewed based on the resultant value.

The center value in the temporary storage portion 16 includes an error component in a short cycle due to the unsteadiness in steering, and hence, cannot be utilized as the substantially effective center value as it is. Therefore, according to the present invention, the center storage portion 40 is provided for removing an error due to the aforesaid unsteadiness in a short cycle and the like. According to the present invention, the error component due to the unsteadiness in the steering in a short cycle can be removed by the take-in of a new center value by the center storage portion 40 when the renewal process of the center value is maintained during the continuation of running through a predetermined distance and by the averaging process on the basis of the circuit when the center value is taken in.

Firstly, a first operation by the predetermined running distance is achieved by ON-OFF operation of the second switch 38 by the distance measuring portion 42.

When the first switch 14 is ON-operated in response to an output from the aforesaid comparison circuit 20, a new center value obtained through the comparison is fed to the temporary storage portion 16 through the differential amplifier 12, and stored in the capacitor. While, an output from the comparison circuit 20 resets the counter in the distance measuring portion 42 to maintain the OFF state of the second switch 38. Upon completion of the renewal of the center value in the temporary storage portion 16, the output from the comparison circuit 20 disappears, whereby the first switch 14 returns to the OFF state, the counter in the distance measuring portion 42 is brought into the set state and the pulses from the vehicle speed sensor 44 are counted. When the counted value reaches a predetermined value, a count-up signal for ON-operating the second switch 38 is emitted, whereby the center value of the temporary storage portion 16 is taken into the center storage portion 40.

In consequence, when a change in steering angle takes place during counting in the distance measuring portion 42 and a signal is emitted again from the comparison circuit 20, the counter in the distance measuring portion 42 is reset again and the second switch 38 cannot be ON-operated. Thus, it is understood that the change in the center value in a short cycle is not taken into the center storage portion 40 from the temporary storage portion 16 and abandoned. Only when the center value is not subjected to the renewal process in the temporary storage portion 16 during counting the predetermined number of pulses, the center value is taken into the center storage portion 40, thus enabling to remove the error component due to the unsteadiness in steering in a short cycle.

Further, according to the present invention, the center storage portion 40 comprises the integration circuit and can average an input signal, whereby the center storage portion 40 averages the center value from the temporary storage portion 18 in cooperation with the ON-operation time of the second switch 38 by the distance measuring portion 42, so that only the effective center value suitable for the actual running condition can be taken out, removing an abrupt change in the center value.

As has been described hereinabove, according to the present invention, the substantially effective change in the vehicle steering value can be reliably, electrically taken out so that various vehicle controls can be effectively performed.

What is claimed is:

1. A device for detecting the center of a steering angle in a vehicle, comprising:

a steering angle sensor provided on a vehicle steering mechanism for electrically detecting a steering angle;

a temporary storing position for temporarily storing a center value calculated in response to an output from said sensor through a first switch;

a comparison circuit for comparing the center value stored in said temporary storage portion with an output from said steering angle sensor to ON-OFF operate the first switch;

a center storage portion for taking out the center value in the temporary storage portion through a second switch to store same; and a distance measuring portion controlled by the comparison circuit, for ON-OFF operating said second switch after a lapse of a predetermined running distance upon ON-operation of said first switch;

said center storage portion including an integration circuit having a resistor and a capacitor.

2. A device for detecting the center of a steering angle in a vehicle as set forth in claim 1, wherein said temporary storing portion comprises a capacitor.

3. A device for detecting the center of a steering angle in a vehicle as set forth in claim 1, wherein said comparison circuit includes a pair of differential amplifiers for making subtraction between a center value in the temporary storage portion and an output from the steering angle sensor to detect a steering angle either to the right or to the left, and, when a steering angle exceeding a predetermined angle takes place, the first switch is ON-operated.

* * * * *